Patented Jan. 16, 1940

2,187,701

UNITED STATES PATENT OFFICE 2,187,701

BARBITURIC ACID DERIVATIVES

Arthur C. Cope, Bryn Mawr, Pa., assignor to Sharp & Dohme, Incorporated, Philadelphia, Pa., a corporation of Maryland No Drawing. Application October 15, 1936, Serial No. 105,826

11 Claims. (Cl. 260—257)

This invention relates to new derivatives of barbituric acid. It relates more particularly to new $\Delta_1$-alkenyl barbituric acids in the form of free acids or salts, and to new processes for their production. The new $\Delta_1$-alkenyl barbituric and thiobarbituric acids are indicated to have valuable hypnotic and anaesthetic properties, with relatively low toxicity.

The compounds produced in accordance with this invention include various barbituric acid derivatives in which the two hydrogens attached to the methylene carbon are replaced, one by a $\Delta_1$-alkenyl group, and the other by an alkyl group, an aralkyl group, an aryl group, a cyclohydrocarbon group, such as the cyclohexyl or cyclopentyl group, or other hydrocarbon or substituted hydrocarbon residue. The compounds may be represented by the graphic formula

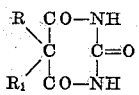

in which R represents a $\Delta_1$-alkenyl group, which may have more than one double bond, and $R_1$ represents another hydrocarbon or substituted hydrocarbon group, which may be saturated or unsaturated, and which may have an open or closed chain. These compounds have a nitrogen-linked hydrogen capable of being replaced to form salts, and salts of the acids may be readily prepared by replacing this hydrogen by a monovalent metal, such as sodium or potassium, or an equivalent of a polyvalent metal, such as calcium or magnesium, or a nitrogen base, such as ammonia, alkylamines or dialkylamines, such as ethylamine or diethylamine, alkynolamines, such as diethanolamine, ephedrine, cocaine, phenylpropanolamine, or the like.

These compounds may be produced by various methods. One advantageous method consists in condensing a di-ester of the corresponding malonic acid with urea, in the presence of sodium ethoxide at ordinary pressure. Another advantageous method consists in condensing the corresponding cyanoacetic ester with urea, in the presence of sodium ethoxide or the like, and subjecting the resulting imino derivative to hydrolysis to remove the imino group. The barbituric acids may, in some cases, be produced by the condensation of the corresponding cyanoacetic ester with thiourea, with hydrolysis of the resulting imino thiobarbituric acid with the removal of the imino group and the substitution of an oxygen atom for the sulfur atom. These methods will be illustrated in specific examples, with particular reference to the production of secondary $\Delta_1$-alkenyl alkyl derivatives, but the invention is not limited thereto.

*Example 1.*—Into a suitable reaction vessel, equipped with a stirrer, reflux condenser, and dropping funnel are placed about 200 parts of anhydrous alcohol and 23.0 parts of sodium are dissolved therein. 30 parts of urea and 76 parts of ethyl isopropenyl malonic ester are then added and the mixture is refluxed for about 8 to 12 hours, with constant stirring, after which the alcohol is distilled off at reduced pressure. The residue is taken up in water, and the neutral products which it contains (amides or unused ester) are removed by extraction with ether. The ether is then distilled from the aqueous layer under reduced pressure, and the aqueous solution is cooled in an ice bath and slowly acidified with about 125–150 parts of concentrated hydrochloric acid. 5-isopropenyl ethyl barbituric acid precipitates. This product is purified by recrystallization from an appropriate solvent, such as water or aqueous alcohol. It melts at 183–184° C.

If, in the process described in the preceding example, the corresponding cyanoacetic ester is used, the acidification precipitates 5-isopropenyl-5-ethyl-4-imino barbituric acid. This imino derivative may be converted into the corresponding barbituric acid by hydrolyzing with boiling mineral acid solution, e. g., 20% hydrochloric or sulfuric acid.

*Example 2.*—30 parts of urea and 70 parts of methyl isopropenyl malonic ester are reacted in a solution of 23 parts of sodium in 300 parts of absolute alcohol, as in Example 1. 5-methyl-5-isopropenyl barbituric acid is produced. The corresponding 5-ethyl 5-1-n-propyl-$\Delta_1$-butenyl barbituric acid melts at 137–138° C.

*Example 3.*—80 parts of allyl isopropenyl malonic ester and 30 parts of urea are reacted in a solution of 23 parts of sodium in about 200 parts of absolute alcohol, as in Example 1. The 5-allyl 5-isopropenyl barbituric acid obtained has a melting point of 141.5–142° C.

The $\Delta_1$-alkenyl alkyl malonic esters which may advantageously be used for the production of corresponding 5,5-$\Delta_1$-alkenyl alkyl barbituric acids may be readily prepared from alkylidene malonic esters by the alkylation of the alkylidene malonic esters with an alkyl salt in the presence of a sodium alkoxide. The $\Delta_1$-alkenyl alkyl cyanoacetic esters may be readily prepared by the condensation of the corresponding alkylidene cyanoacetate ester with an alkyl salt in the presence of a sodium alkoxide or the like. Or, both the alkyl $\Delta_1$-alkenyl cyanoacetic esters and the malonic esters may be readily prepared by reacting an alkyl salt, such as alkyl halide or sulfate, with an alkylidene malonic ester or cyanoacetic ester in an inert solvent in the presence of metallic sodium.

A wide range of secondary $\Delta_1$-alkenyl barbituric acids may be prepared by the process of the present invention, and are included as new products within the scope of the invention. Included among the new secondary $\Delta_1$-alkenyl barbituric acids which may be prepared by the process of the foregoing examples, are compounds in which the secondary $\Delta_1$-alkenyl group may be one of the following:

Isopropenyl
1-methyl-$\Delta_1$-n-propenyl
1-methyl-$\Delta_1$-butenyl (normal or iso)
1-methyl-$\Delta_1$-pentenyl (normal or iso)
1-methyl-$\Delta_1$-hexenyl (normal or iso)
1-methyl-$\Delta_1$-heptenyl (normal or iso)
1-ethyl-$\Delta_1$-propenyl
1-butyl-$\Delta_1$-pentenyl and others, and in which the other bond of the methylene carbon of the barbituric acid may be attached to one of the following radicals:

Methyl
Ethyl
Propyl (normal or iso)
Butyl (normal, iso or secondary)
Allyl
Crotyl
Amyl (normal, iso or secondary)
Cinnamyl
Citronellyl
Hexyl (normal, iso or secondary)
Cyclohexyl
Cyclopentyl
Phenyl-ethyl
Benzyl
Heptyl (normal, iso or secondary)

and others.

These $\Delta_1$-alkenyl barbituric acids have a nitrogen-linked hydrogen replaceable by a metal or a nitrogen base, and hence it is possible to form salts of these acids. For example, the sodium salts, which are water-soluble, may be conveniently prepared by reacting one of the free acids with an equivalent of sodium ethoxide in absolute alcohol. If the resulting salt is too soluble in alcohol to be readily separated, it may be precipitated by the addition of ether, ligroin, or the like.

The term "alkyl" as used in this specification and the appended claims is to be construed in its broader sense, as including both saturated and unsaturated compounds, with straight or branched chains, as well as aralkyl compounds; the term "alkylidene" is to be construed in its broader sense, as including aralkylidene compounds and compounds in which the alkylidene group has straight or branched chains which may be saturated or unsaturated; and the term "$\Delta_1$-alkenyl" is also to be construed in its broader sense, to include compounds in which the $\Delta_1$-alkenyl group is straight or branched chain, including compounds in which this group contains not only the $\Delta_1$ double bond, but also other unsaturated linkages.

I claim:

1. Secondary 5-$\Delta_1$-alkenyl barbituric acids in which the alkenyl group is an open chain group.

2. 5-$\Delta_1$-alkenyl barbituric acids in which the alkenyl group is an open chain group having at least three carbon atoms.

3. 5-$\Delta_1$-alkenyl 5-alkyl barbituric acids in which the alkenyl group is an open chain group having at least three carbon atoms.

4. Secondary 5-$\Delta_1$-alkenyl 5-alkyl barbituric acids in which the alkenyl group is an open chain group.

5. 5-alkyl 5-isopropenyl barbituric acids.

6. 5-ethyl 5-isopropenyl barbituric acid.

7. 5-ethyl 5-1-n-propyl-$\Delta_1$-butenyl barbituric acid.

8. 5-allyl 5-isopropenyl barbituric acid.

9. 5-alkenyl barbituric acids in which the alkenyl group has at least four carbon atoms and is an open chain group.

10. Secondary 5-alkenyl barbituric acids in which the alkenyl group has at least four carbon atoms and is an open chain group.

11. Secondary 5-alkenyl 5-alkyl barbituric acids in which the alkenyl group has at least four carbon atoms and is an open chain group.

ARTHUR C. COPE.